(12) United States Patent
Yang

(10) Patent No.: US 8,725,210 B2
(45) Date of Patent: May 13, 2014

(54) ATTACHABLE ASSEMBLY

(71) Applicant: Sheng-Long Yang, Taipei (TW)

(72) Inventor: Sheng-Long Yang, Taipei (TW)

( * ) Notice: Subject to any disclaimer, the term of this patent is extended or adjusted under 35 U.S.C. 154(b) by 0 days.

(21) Appl. No.: 13/632,764

(22) Filed: Oct. 1, 2012

(65) Prior Publication Data

US 2014/0094221 A1   Apr. 3, 2014

(51) Int. Cl.
*H04B 1/38* (2006.01)

(52) U.S. Cl.
USPC ..... 455/557; 455/566; 455/575.1; 455/575.6; 455/90.1; 455/90.3; 359/22

(58) Field of Classification Search
CPC .............................. H04W 88/02; H04M 1/7253
USPC ......... 455/557, 566, 575.1, 575.6, 90.1, 90.3; 359/22

See application file for complete search history.

(56) References Cited

U.S. PATENT DOCUMENTS

2009/0244667 A1* 10/2009 Frentz et al. .................... 359/22
2012/0320340 A1* 12/2012 Coleman, III ................. 351/208

* cited by examiner

*Primary Examiner* — Sanh Phu
(74) *Attorney, Agent, or Firm* — Muncy, Geissler, Olds & Lowe, P.C.

(57) ABSTRACT

An attachable assembly for smart phone that has at least one contact site disposed thereon is disclosed. The attachable assembly comprises a mount unit and an extension device. The mount unit is fixed at one edge of the smart phone, and has at least one locking slot disposed thereon; the extension device electrically contacts the contact site and has at least one locking member selectively engaged to the locking slot. Wherein, the extension device has a rotative axis so that the extension device is rotated and fitted with the mount unit.

15 Claims, 8 Drawing Sheets

ATTACHABLE ASSEMBLY

BACKGROUND OF THE INVENTION

1. Field of the Invention

The present invention relates to an attachable assembly for smart phone, and more particularly to an attachable assembly for connecting any types of extension devices or accessories to the smart phone so as to provide the flexible capability.

2. Description of Related Art

In recent years mobile telephones have become much more than just telephones. Advanced mobile telephones, commonly referred to as "smart phones" have become powerful, ubiquitous computing devices, providing portable internet access, powerful computer processing ability and media storage. Such devices can access, store and play various media such as movies, photos, music, etc.

Advances in smart phone technology have reached a point that, for many users such smart phones provide their primary access to the internet. It may even come to pass in the foreseeable future that such smart phones may be connected to any other host devices such as standard desktop or laptop computer systems. However, the most potential application for the smart phone may be the connection between smart phone and specific extension device for specific function. Their small size and portability allow these devices to be always accessible, becoming an invaluable tool for a variety of applications including social networking, GPS based navigation, entertainment, communication in a variety of media, etc.

While the small size of such devices provides unprecedented convenience and accessibility for users, such devices suffer from certain limitations as a result of their very small size. For example, the extension device for the smart phone is difficult to design and lacks for mechanical strength. Therefore, no matter what resolution image can be achieved, the small size of the smart phone makes many fastening or fixing structures difficult, impractical or impossible to arrange. This can be an even greater problem for users who always incautiously release and attach the extension device from the smart phone.

Therefore, while the evolution of smart phone technology presents a virtually unlimited growth in computer power, functional capability and wireless data speed, data input and display, such kind of mechanical problems may be occurred drastically.

SUMMARY OF THE INVENTION

The primary object of the present invention is to have the smart phone conveniently access any type of extension device, and then easily attach and detach from the smart phone.

Another object of the present invention is to simplify the mechanical connection configuration between the smart phone and the extension device.

Yet another object of the present invention is to have sufficient mechanical strength to sustain the extension device from the smart phone.

To achieve the above purposes, an attachable assembly for smart phone is disclosed. The smart phone has at least one contact site disposed thereon. The attachable assembly comprises a mount unit and an extension device. The mount unit is fixed at one edge of the smart phone, and has at least one locking slot disposed thereon; the extension device electrically contacts the contact site and has at least one locking member selectively engaged to the locking slot. Wherein the extension device has a rotative axis so that the extension device is rotated and fitted with the mount unit.

According to one embodiment of the attachable assembly for smart phone, wherein the number of the locking member is a plurality, and the locking members are evenly spaced circumferentially along with the rotative axis.

According to one embodiment of the attachable assembly for smart phone, wherein the number of the locking slot is a plurality, and the locking slots are evenly spaced circumferentially along with the rotative axis.

According to one embodiment of the attachable assembly for smart phone, wherein the mount unit has at least one positioning pin to match with the smart phone; the smart phone has a Printed Circuit Board (PCB) with at least one positioning hole to fit the positioning pin.

According to one embodiment of the attachable assembly for smart phone, wherein locking member has an inclined surface to abut against the edge of the locking slot.

According to one embodiment of the attachable assembly for smart phone, wherein the locking slot has an inclined edge to abut against the locking member.

According to one embodiment of the attachable assembly for smart phone, wherein the locking slot is curved shape or bending shape.

According to one embodiment of the attachable assembly for smart phone, wherein the locking member has a flexible component disposed thereon and the locking slot has a recess to selectively match with the flexible component.

According to one embodiment of the attachable assembly for smart phone, wherein the mount unit has a trough disposed thereon and the extension device has a releasable tenon selectively fitted to the trough; the tenon is pushed to protrude by a spring.

According to one embodiment of the attachable assembly for smart phone, wherein the mount unit has a trough disposed thereon and the extension device has a releasable tenon selectively fitted to the trough; the tenon is retractable by a release button; the extension device has a spring pushing the release button to rebound. Therefore, the retracting direction of the locking member is different from the pushing direction of the release button.

According to one embodiment of the attachable assembly for smart phone, wherein the mount unit is fixed on the smart phone by at least one screw.

According to one embodiment of the attachable assembly for smart phone, wherein the locking member is disposed at the radial side of the extension device.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

1st Embodiment

Figure 1A:
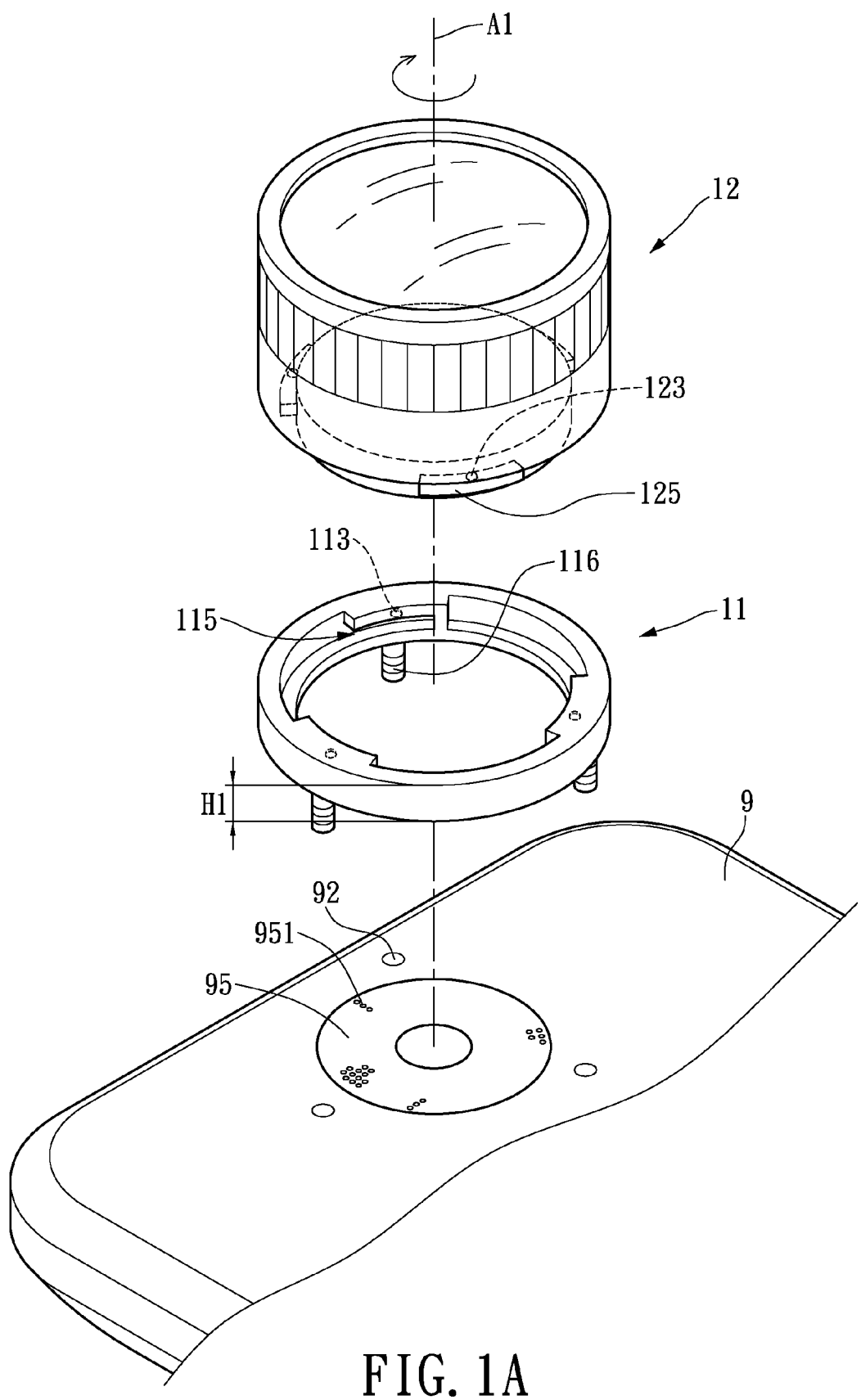
FIG. 1A shows a schematic view of the attachable assembly before installation according to the 1$^{st}$ embodiment of the instant disclosure.
Figure 1B:
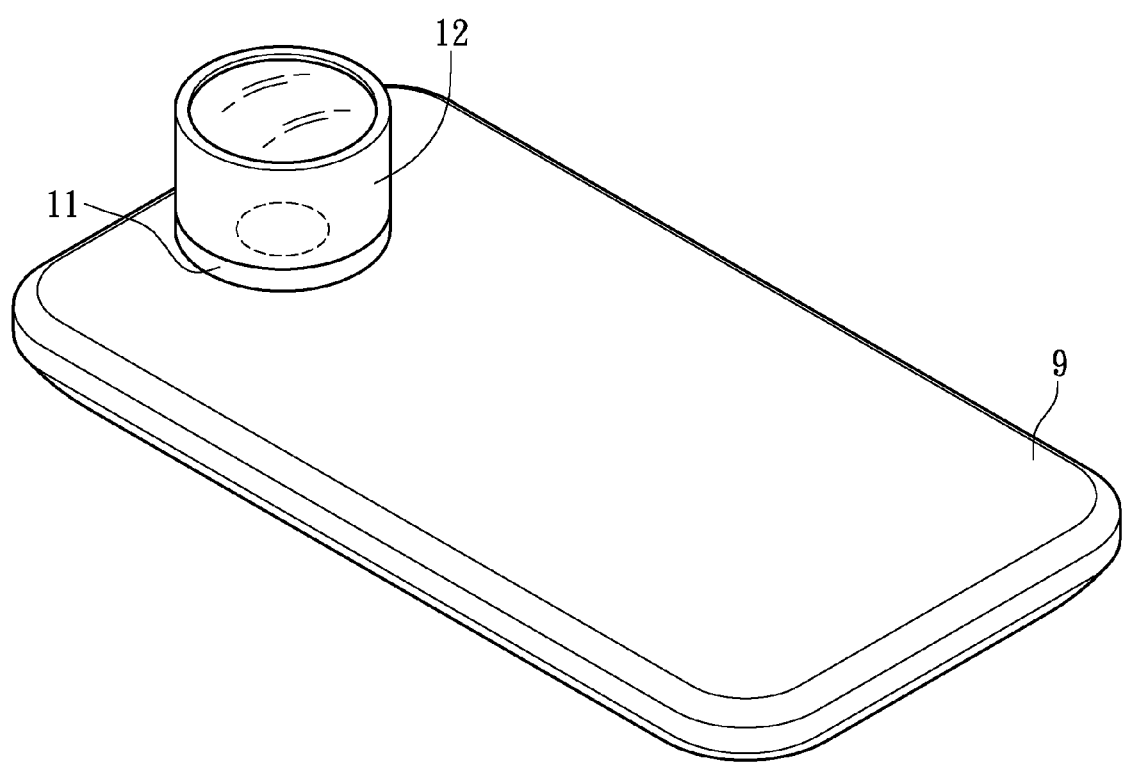
FIG. 1B shows a schematic view of the attachable assembly after installation according to the 1$^{st}$ embodiment of the instant disclosure.

Referring to FIG. 1A to FIG. 1D, where the first embodiment of the instant disclosure provides an attachable assembly for a smart phone 9. The attachable assembly comprises a mount unit 11 fixing at upper edge of the smart phone 9, and an extension device 12 selectively connecting to the mount unit 11. Preferably, the mount unit 11 is arranged in the backboard, and therefore the extension device 12 is attached to the back side (as opposite to the screen in the front side) of the smart phone 9. The smart phone 9 further has a Printed Circuit Board (PCB) 95 disposed thereon. The extension device 12 is a camera module in this embodiment; however, it could be any electrical accessories for video or audio need, entertainment, wireless access, computing or controlling process, media storage, data transferring, internet connection, communication, or particularly image processing purpose. The smart phone 9 has at least one positioning hole 92 disposed on the outer surface of the smart phone 9 or on the PCB 95 of the smart phone 9. The mount unit 11 has at least one positioning pin 116 (the same number with the position hole 92) disposed at lower side of the mount unit 11. In this manner, the positioning pins 116 may be guided and inserted into the positioning holes 92, so that the mount unit 11 may be therefore matched and fixed with the smart phone 9. In this manner, the PCB 95 faced upward may be electrically contacted and coupled to the lower side of the extension device 12, by a plurality of contact sites 951. Conventionally, the contact site 951 could be wire, electric pin, joint or any substantial connecting point. The PCB 95 also could be any shape or any configuration according to real situation of the mount unit 11 and smart phone 9. When the smart phone 9 is finished installation and sold out from the factory, the mount unit is firmly connected and fixed on the smart phone 9.

Figure 1C:
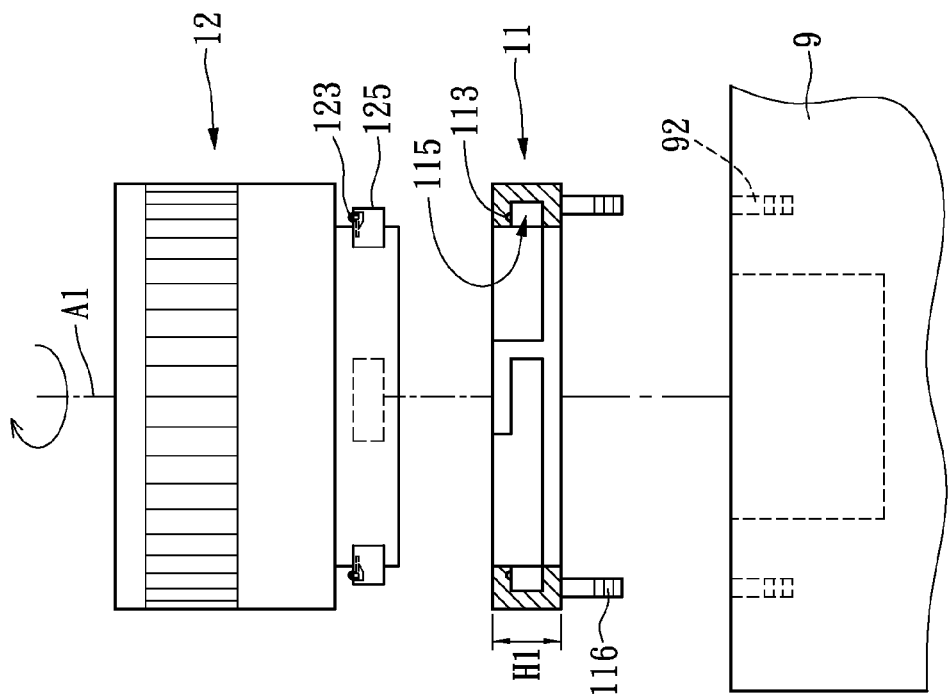
FIG. 1C shows a perspective view of the attachable assembly before installation according to the 1st embodiment of the instant disclosure.
Figure 1D:
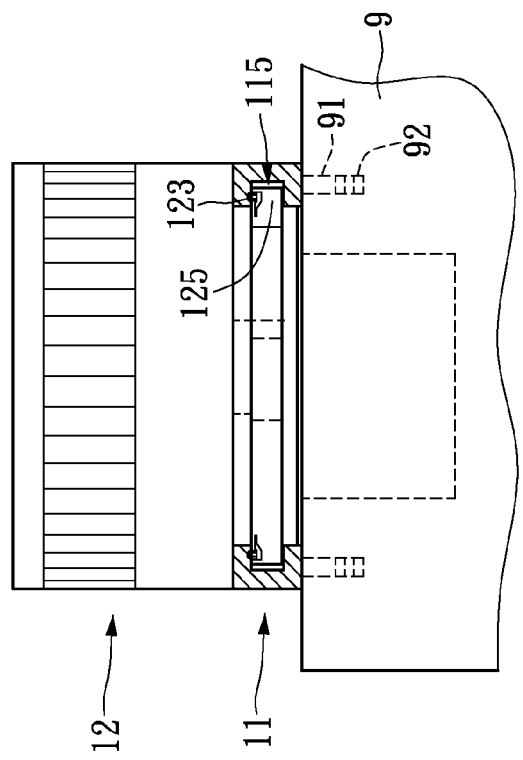
FIG. 1D shows a perspective view of the attachable assembly after installation according to the 1st embodiment of the instant disclosure.

Further, the mount unit 11 has three locking slots 115 disposed thereon, and the extension device 12 has three locking members 125 disposed at the radial side of the extension device 12, so that each locking member 125 may be moved downward to engage to the locking slot 115. Conventionally, the locking member 125 could be a delicate and complex structure, which may increase total weight of the smart phone 9. According to the instant disclosure of the present invention, the heavier and bulky locking member 125 is disposed at the extension device 12 which can make the smart phone 9 weightless and thus increase portability. Namely, the locking member 125 disposed in the extension device 12 and the locking slot 115 disposed at side of the smart phone 9 can simplify the configuration of the mount unit 11, so as to make the smart phone 9 concise. Beside, the locking slot 115 is a L-shaped space. When user moves the extension device 12 downward and then rotated along with the rotative axis A1 as shown in FIG. 1A and FIG. 1C, the locking member 125 may be fitted and then fastened into the locking slot 115, so that the extension device 12 is firmly fixed in the mount unit 11. Reversely rotation and upward movement may therefore detach the extension device 12 from the mount unit 11. Preferably, the pluralities of the locking members 125 are evenly spaced circumferentially along with the rotative axis A1; as a consequence, the pluralities of the locking slots 115 are also evenly spaced circumferentially along with the rotative axis A1.

In order to assist immobility and prevent unwanted rotation, the locking member 125 may further has a flexible component 123 disposed thereon; correspondingly, the locking slot 115 has a recess 113 to selectively match with the flexible component 123. When the extension device 12 is approached to the mount unit 11 and then the locking member 125 is abutted upon the locking slot 115, the mount unit 11 can be rotated until the flexible component 123 is matched with the recess 113 (shown in FIG. 1A and FIG. 1C).

Furthermore, the mount unit 11 has a height H1 to protrude above the upper surface of the smart phone 9; practically, the height H1 is lower and better, to achieve succinct purpose. In some other embodiment, the pluralities of locking members 125 may also be disposed at the lowest side (i.e. axial end) of the extension device 12.

2nd Embodiment

Figure 2:
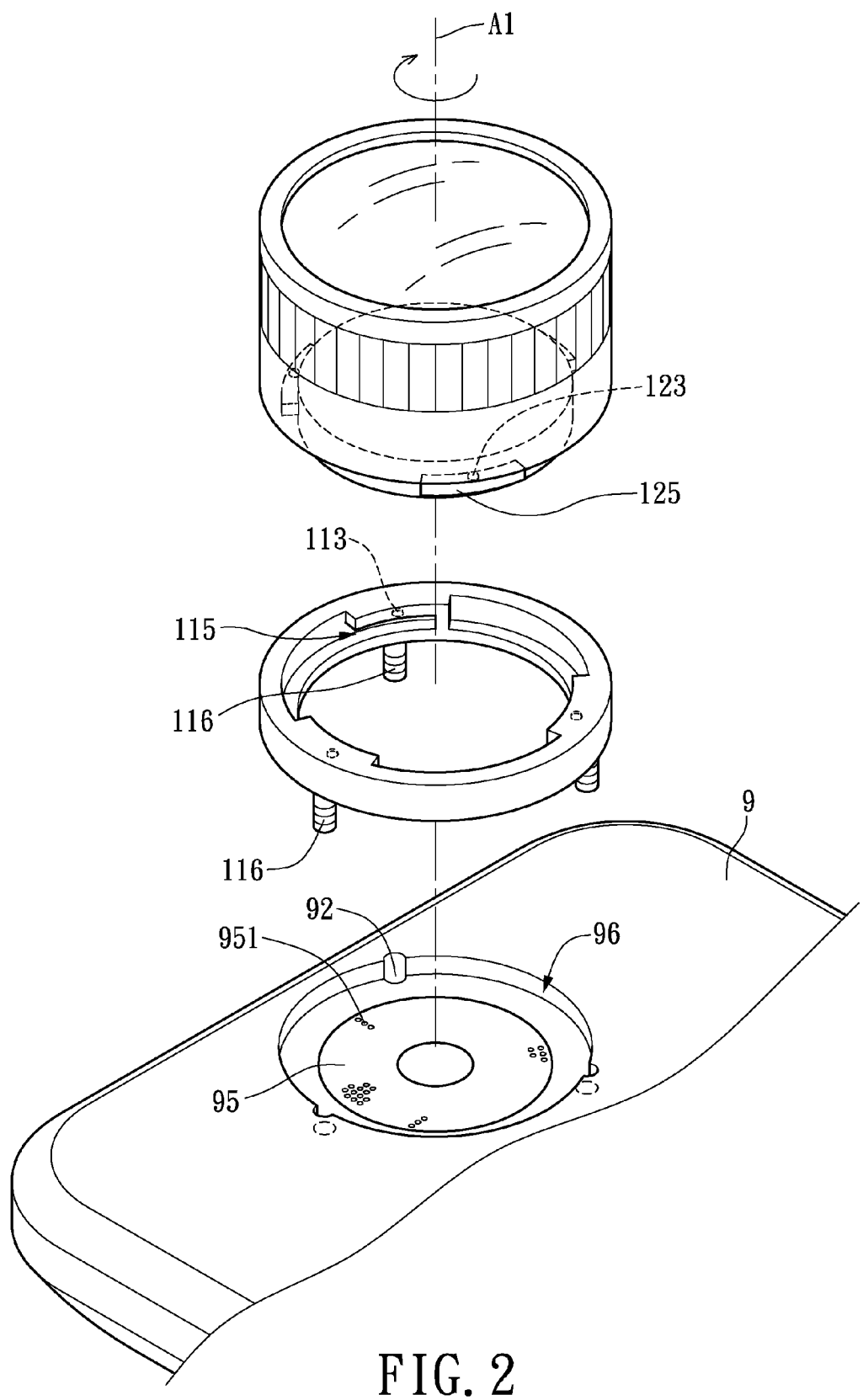
FIG. 2 shows a schematic view of the attachable assembly before installation according to the 2nd embodiment of the instant disclosure.

Referring to FIG. 2, FIG. 2 shows a schematic view of the attachable assembly before installation according to the 2nd embodiment of the instant disclosure. In the following diagrams, similar component and structure is not addressed again. In this embodiment, the mount unit 11 is embedded in the smart phone 9; specifically, the smart phone 9 is hollowed out a cave 96 to receive the mount unit 11, so that whole or part of the mount unit 11 could be disposed below the upper surface of the smart phone 9. As a result, the PCB 95 and the contact sites 951 disposed at bottom of the cave 96 are absolutely required. Furthermore, the positioning holes 92 could be disposed at the circumference of the cave 96.

3rd Embodiment

Figure 3A:
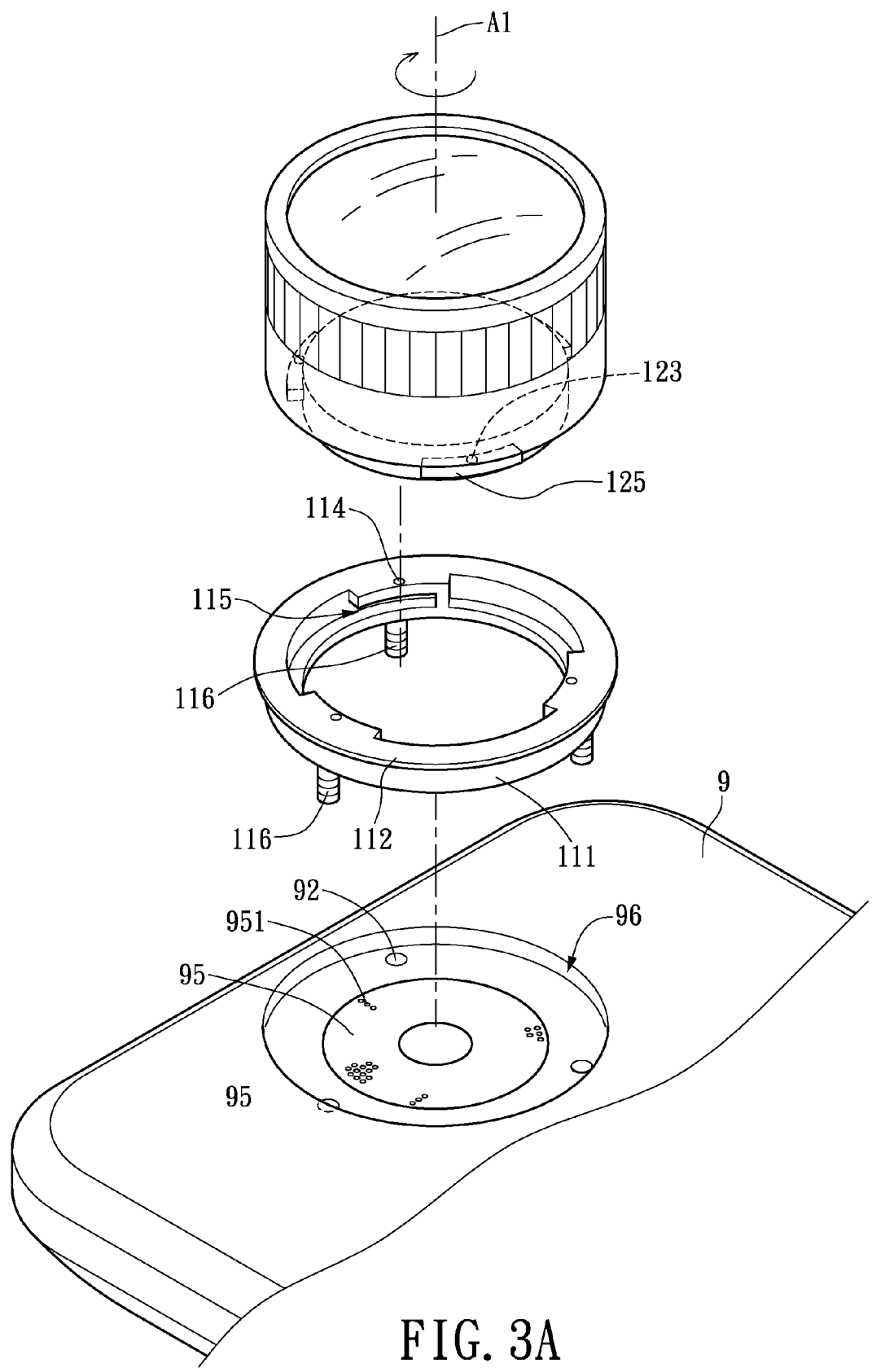
FIG. 3A shows a schematic view of the attachable assembly before installation according to the 3rd embodiment of the instant disclosure.
Figure 3B:
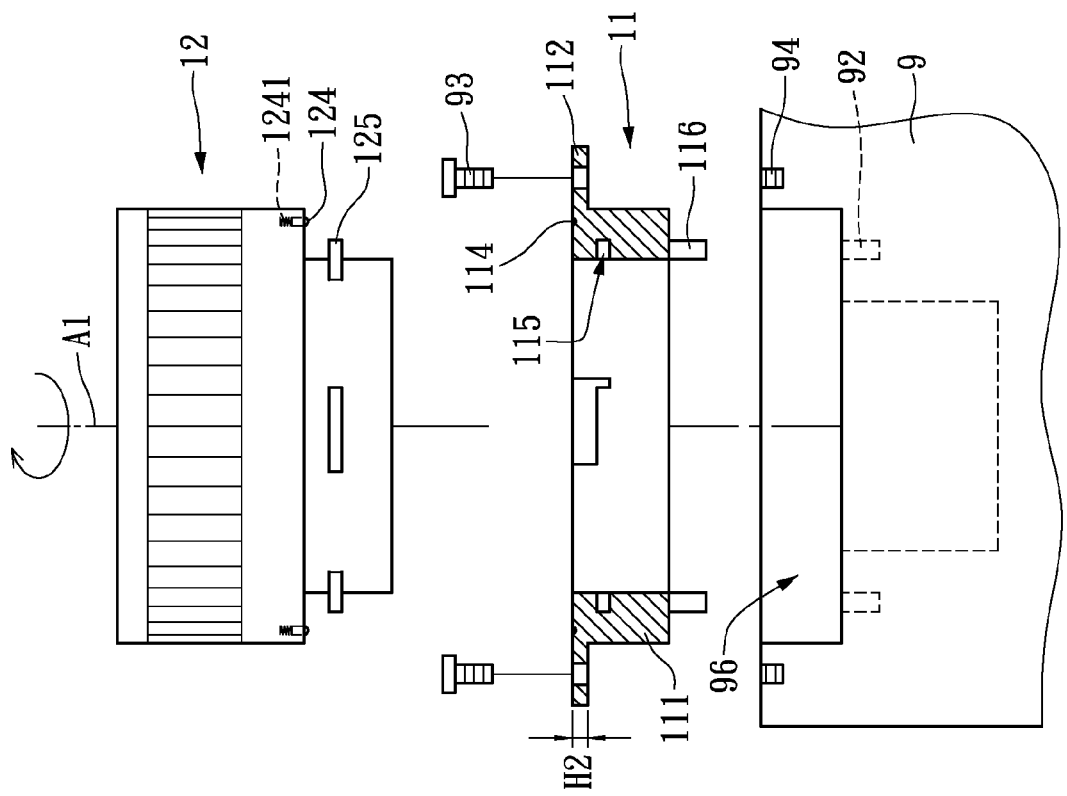
FIG. 3B shows a perspective view of the attachable assembly before installation according to the 3rd embodiment of the instant disclosure.
Figure 3C:
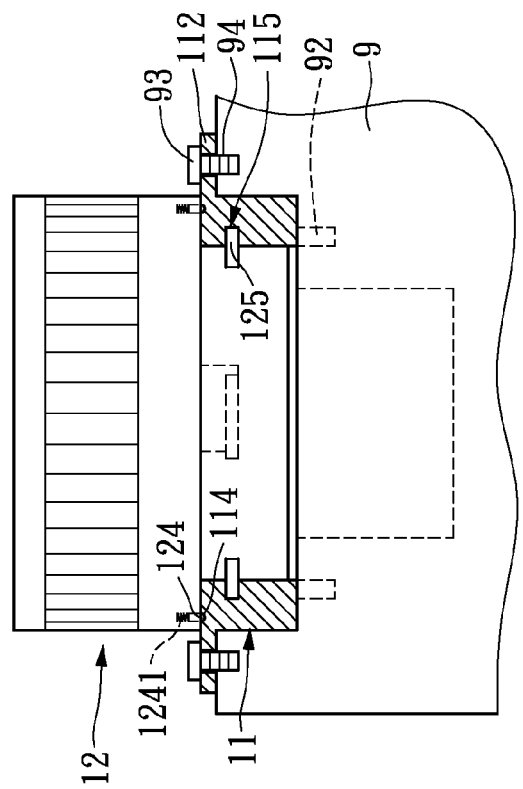
FIG. 3C shows a perspective view of the attachable assembly after installation according to the 3rd embodiment of the instant disclosure.

Referring to FIG. 3A to FIG. 3C, the mount unit 11 has a body 111 to be received inside the cave 96, and a cap 112 to be retained at upper surface of the smart phone 9. As shown in FIG. 3B, several screws 93 pass through the cap 112 and fasten with screw hole 94 which can further increase the mechanical strength between the smart phone 9 and the mount unit 11; namely, the mount unit 11 can be firmly fixed on the smart phone 9 by the screws 93. As shown in FIG. 3A, the positioning holes 92 are disposed at bottom of the cave 96.

As shown in FIG. 3B and FIG. 3C, the mount unit 11 has a trough 114 disposed thereon and faced upward. The extension device 12 has a releasable tenon 124 faced downward to selectively fit to the trough 114. When the extension device 12 moves downward and rotates along the rotative axis A1, the locking member 125 may be rotated and then stopped rotation by means of matching the tenon 124 and the trough 114. Preferably, the tenon 124 is pushed to protrude by a spring 1241, to drive the tip of the tenon 124 to enter the trough 114. Besides, each locking slot 115 is located at the same altitude to receive the locking member 125; however in some other embodiment, the locking slot 115 might also have an inclined edge to abut against the locking member 125 (eg. entire locking slot 115 is located at distinct altitude). Contrarily, the locking member 125 might also have an inclined surface to abut against the edge of the locking slot 115, to have the extension device 12 screwed-rotate. Further, the locking slot 115 may also be curved shape or bending shape.

4$^{th}$ Embodiment

Figure 4A:
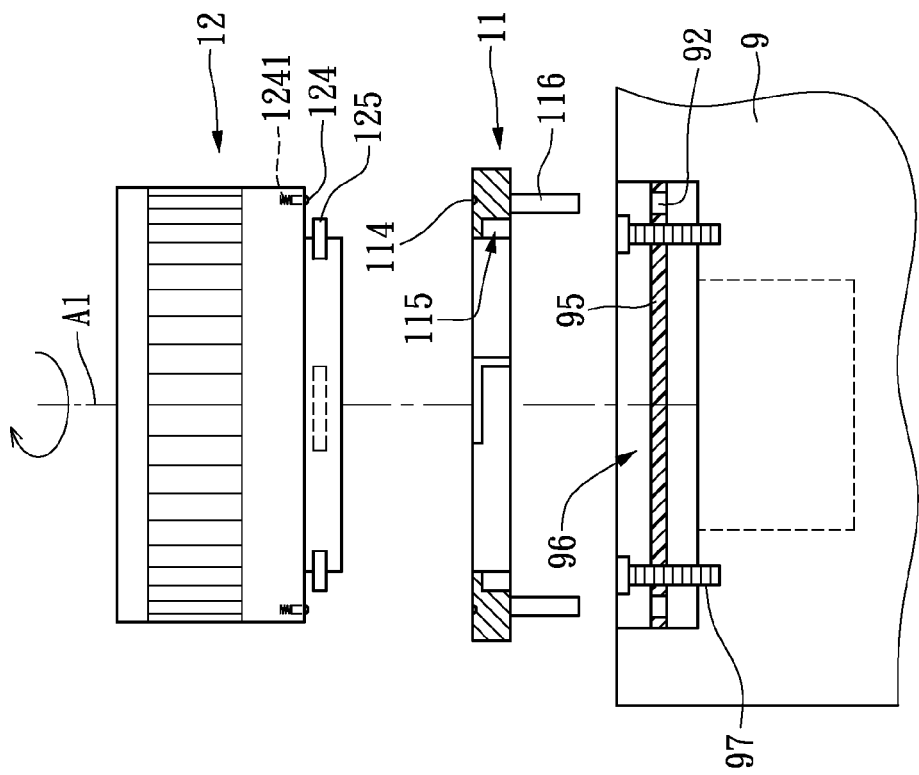
FIG. 4A shows a perspective view of the attachable assembly before installation according to the 4th embodiment of the instant disclosure.
Figure 4B:
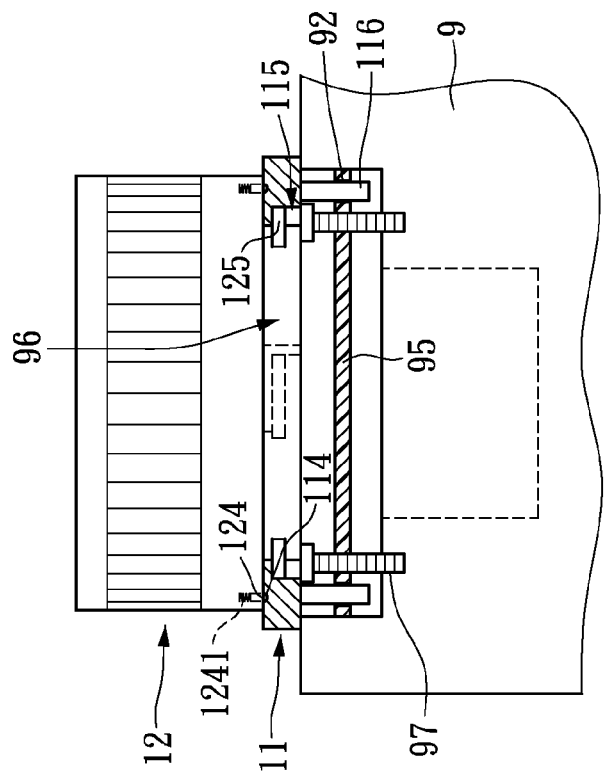
FIG. 4B shows a perspective view of the attachable assembly after installation according to the 4th embodiment of the instant disclosure.

Referring to FIG. 4A~4B, the smart phone 9 has the PCB 95 disposed in the cave 96 and with at least one positioning hole 92 to fit the positioning pin 116. As shown in FIG. 4A, the locking slot 115 is open to lower side, which may cause insufficient mechanical strength and poor fastening force between the locking member 125 and locking slot 115. Therefore positioning pins 116 fastened to the PCB 95 and screws 97 fastened the PCB 95 to the smart phone 9 are absolutely required, to significantly improve the mechanical strength. In this embodiment, the PCB 95 may provide control and electrical connection for the extension device 12.

5$^{th}$ Embodiment

Figure 5:
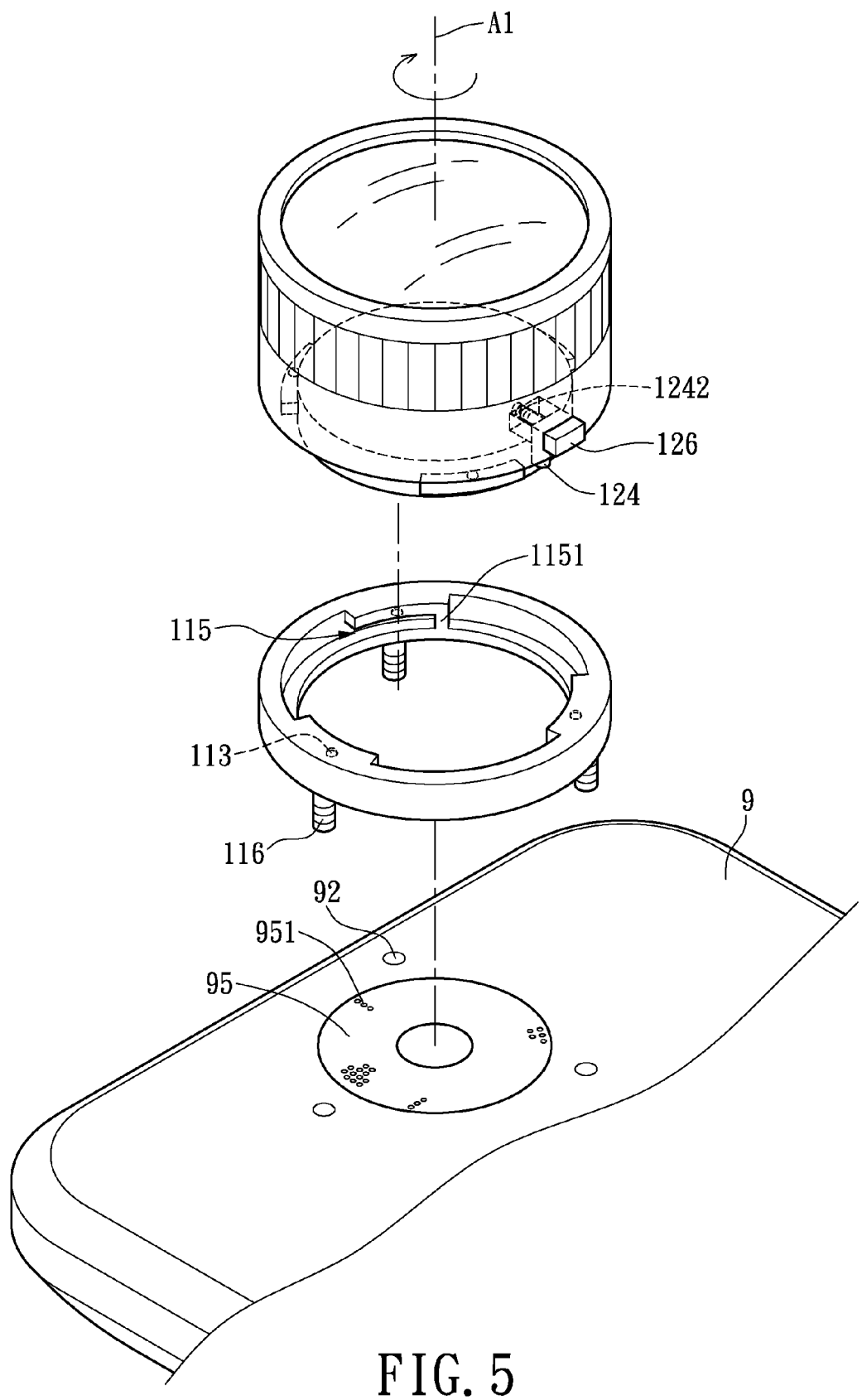
FIG. 5 shows a schematic view of the attachable assembly before installation according to the 5th embodiment of the instant disclosure.

Referring to FIG. 5, the extension device 12 further has a release button 126, and a spring 1242 pushing the release button 126 to rebound toward radial direction; meanwhile, the tenon 124 disposed at lowest edge of the extension device 12 is retractable by the cooperation of the release button 126 and the spring 1242. In this manner, the retracting direction of the locking member 125 is different from the pushing direction of the release button 126, to have the tenon 124 arranged at any site of the extension device 12; this can increase the installation capability for the mount unit 11.

Summarily, the attachable assembly according to the instant invention may provides convenience and accessibility for any type of extension device 12 to selectively attach and detach; meanwhile, the configuration of the attachable assembly have sufficient mechanical strength to sustain the extension device 12.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. An attachable assembly for smart phone that having at least one contact site disposed thereon, comprising:
    a mount unit, fixing at one edge of the smart phone, and having at least one locking slot disposed thereon; and
    an extension device, electrically contacted the contact site and having at least one locking member selectively engaged to the locking slot;
    wherein the extension device has a rotative axis so that the extension device is rotated and fitted with the mount unit; and
    wherein the mount unit further has a trough disposed thereon and the extension device further has a releasable tenon that is pushed resiliently to protrude in a direction of the rotative axis and that is selectively fitted to the trough.

2. The attachable assembly of claim 1, wherein the number of the locking member is a plurality, and the locking members are evenly spaced circumferentially along with the rotative axis.

3. The attachable assembly of claim 1, wherein the number of the locking slot is a plurality, and the locking slots are evenly spaced circumferentially along with the rotative axis.

4. The attachable assembly of claim 1, wherein the mount unit has at least one positioning pin to match with the smart phone.

5. The attachable assembly of claim 4, wherein the smart phone has a Printed Circuit Board (PCB) with at least one positioning hole to fit the positioning pin.

6. The attachable assembly, of claim 1, wherein the locking member has an inclined surface to abut against the edge of the locking slot.

7. The attachable assembly of claim 1, wherein the locking slot has an inclined edge to abut against the locking member.

8. The attachable assembly of claim 1, wherein the locking slot is curved shape or bending shape.

9. The attachable assembly of claim 1, wherein the locking member has a flexible component disposed thereon and the locking slot has a recess to selectively match with the flexible component.

10. The attachable assembly of claim 1, wherein the tenon is pushed to protrude by a spring.

11. The attachable assembly of claim 1, wherein the tenon is retractable by a release button.

12. The attachable assembly of claim 11, wherein the extension device has a spring pushing the release button to rebound.

13. The attachable assembly of claim 12, wherein the retracting direction of the locking member is different from the pushing direction of the release button.

14. The attachable assembly of claim 1, wherein the mount unit is fixed on the smart phone by at least one screw.

15. The attachable assembly of claim 1, wherein the locking member is disposed at the radial side of the extension device.

* * * * *